(12) United States Patent
Rowe et al.

(10) Patent No.: US 11,491,647 B2
(45) Date of Patent: Nov. 8, 2022

(54) ARTIFICIAL MUSCLES COMPRISING A GRADIENT STIFFENED ELECTRODE PAIR AND ARTIFICIAL MUSCLE ASSEMBLIES INCLUDING SAME

(71) Applicant: Toyota Motor Engineering & Manufacturing North America, Inc., Plano, TX (US)

(72) Inventors: Michael P. Rowe, Pinckney, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/168,376

(22) Filed: Feb. 5, 2021

(65) Prior Publication Data
US 2022/0176551 A1 Jun. 9, 2022

Related U.S. Application Data

(60) Provisional application No. 63/122,775, filed on Dec. 8, 2020.

(51) Int. Cl.
| B25J 9/10 | (2006.01) |
| F15B 15/10 | (2006.01) |
| B25J 9/14 | (2006.01) |

(52) U.S. Cl.
CPC .......... B25J 9/1075 (2013.01); B25J 9/142 (2013.01); F15B 15/103 (2013.01)

(58) Field of Classification Search
CPC ......... F15B 15/00; F15B 15/103; B25J 9/142; B25J 9/1075
See application file for complete search history.

(56) References Cited

U.S. PATENT DOCUMENTS

| 8,981,621 B2 | 3/2015 | Pelrine et al. |
| 10,640,033 B1 | 5/2020 | Gandhi et al. |
| 2020/0032822 A1 | 1/2020 | Keplinger et al. |

FOREIGN PATENT DOCUMENTS

| JP | 2005230957 A | 9/2005 |
| WO | 2019173227 A1 | 9/2019 |

(Continued)

OTHER PUBLICATIONS

Shane K. Mitchell, et al., "An Easy-To-Implement Toolkit To Create Versatile And High-Performance HASEL Actuators For Untethered Soft Robots," Journal Article, Advanced Science 6(14):1900178, Jun. 2019, URL: https://www.researchgate.net/figure/Generalized-principle-of-zipping-mode-actuation-in-HASEL-actuators-As-Voltage-is_fig1_333725822, 15 pages.

(Continued)

Primary Examiner — Thomas E Lazo
Assistant Examiner — Daniel S Collins
(74) Attorney, Agent, or Firm — Dinsmore & Shohl LLP (57) ABSTRACT

Artificial muscles are provided including a housing having an electrode region and an expandable fluid region, an electrode pair including a first electrode and a second electrode positioned in the electrode region of the housing, a dielectric fluid housed within the housing, and a stiffening member positioned between the housing and at least one of the first electrode and the second electrode. The stiffening member increases a stiffness of the housing in a direction toward the expandable fluid region from an opposite edge of the electrode region. The electrode pair is actuatable between a non-actuated state and an actuated state such that actuation from the non-actuated state to the actuated state directs the dielectric fluid into the expandable fluid region.

20 Claims, 7 Drawing Sheets

(56) References Cited

FOREIGN PATENT DOCUMENTS

WO 2019236643 A1 12/2019
WO WO-2020180982 A1 * 9/2020

OTHER PUBLICATIONS

E. Acome, et al., "Hydraulically Amplified Self-Healing Electrostatic Actuators With Muscle-Like Performance," Science Journal, Jan. 5, 2018: vol. 359, Issue 6371, pp. 61-65, Department of Mechanical Engineering & Materials Science and Engineering Program, University of Colorado, Boulder, CO 80309, USA.

* cited by examiner

ARTIFICIAL MUSCLES COMPRISING A GRADIENT STIFFENED ELECTRODE PAIR AND ARTIFICIAL MUSCLE ASSEMBLIES INCLUDING SAME

CROSS-REFERENCE TO RELATED APPLICATION

This application claims priority to U.S. Provisional Patent Application No. 63/122,775, filed Dec. 8, 2020, for "Artificial Muscles Comprising A Gradient Stiffened Electrode Pair And Artificial Muscle Assemblies Including Same," which is hereby incorporated by reference in its entirety including the drawings.

TECHNICAL FIELD

The present specification generally relates to apparatus and methods for focused inflation on at least one surface of a device, and, more specifically, apparatus and methods for utilizing an electrode pair to direct a fluid to inflate the device.

BACKGROUND

Current robotic technologies rely on rigid components, such as servomotors to perform tasks, often in a structured environment. This rigidity presents limitations in many robotic applications, caused, at least in part, by the weight-to-power ratio of servomotors and other rigid robotics devices. The field of soft robotics improves on these limitations by using artificial muscles and other soft actuators. Artificial muscles attempt to mimic the versatility, performance, and reliability of a biological muscle. Some artificial muscles rely on fluidic actuators, but fluidic actuators require a supply of pressurized gas or liquid, and fluid transport must occur through systems of channels and tubes, limiting the speed and efficiency of the artificial muscles. Other artificial muscles use thermally activated polymer fibers, but these are difficult to control and operate at low efficiencies.

One particular artificial muscle design is described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). These hydraulically amplified self-healing electrostatic (HASEL) actuators use electrostatic and hydraulic forces to achieve a variety of actuation modes. HASEL actuator artificial muscles include a housing having a uniform stiffness, which compresses upon being actuated to push a fluid into an expandable fluid region. However, the housing may compress and direct a fluid in a direction away from the expandable fluid region due to the uniform stiffness of the housing.

Accordingly, a need exists for improved artificial muscles having a gradient stiffness such that the artificial is actuated to more effectively direct the fluid into an expandable fluid region.

SUMMARY

In one embodiment, an artificial muscle includes a housing having an electrode region and an expandable fluid region, an electrode pair including a first electrode and a second electrode positioned in the electrode region of the housing, a dielectric fluid housed within the housing, and a stiffening member positioned between the housing and at least one of the first electrode and the second electrode, the stiffening member increasing a stiffness of the housing in a direction toward the expandable fluid region from an opposite edge of the electrode region, wherein the electrode pair is actuatable between a non-actuated state and an actuated state such that actuation from the non-actuated state to the actuated state directs the dielectric fluid into the expandable fluid region.

In another embodiment, an artificial muscle includes a housing having an electrode region and an expandable fluid region, an electrode pair including a first electrode and a second electrode positioned in the electrode region of the housing, a dielectric fluid housed within the housing, and a pair of stiffening members positioned between the housing and each of the first electrode and the second electrode, the pair of stiffening members increasing a stiffness of the housing in a direction toward the expandable fluid region from an opposite edge of the electrode region, wherein the electrode pair is actuatable between a non-actuated state and an actuated state such that actuation from the non-actuated state to the actuated state causes a distance between the electrode pair proximate the opposite edge of the electrode region to be decreased prior to a distance between the electrode pair proximate the expandable fluid region being decreased.

In yet another embodiment, a method for actuating an artificial muscle includes providing a voltage using a power supply electrically coupled to an electrode pair of an artificial muscle, the artificial muscle including a housing having an electrode region and an expandable fluid region, the electrode pair including a first electrode and a second electrode positioned in the electrode region of the housing, a dielectric fluid housed within the housing, and a stiffening member positioned between the housing and at least one of the first electrode and the second electrode, the stiffening member increasing a stiffness of the housing in a direction toward the expandable fluid region from an opposite edge of the electrode region, and actuating the electrode pair between a non-actuated state and an actuated state such that actuation from the non-actuated state to the actuated state directs the dielectric fluid into the expandable fluid region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to artificial muscles and methods of operating artificial muscles. The artificial muscles described herein are actuatable to selectively raise and lower a region of the artificial muscles to provide a selective, on demand inflated expandable fluid region. The artificial muscles include a housing and an electrode pair. A dielectric fluid is housed within the housing, and the housing includes an electrode region and an expandable fluid region, where the electrode pair is positioned in the electrode region. The electrode pair includes a first electrode fixed and a second electrode positioned within the electrode region of the housing. A stiffening member is positioned between the housing and at least one of the first electrode and the second electrode. The stiffening member increases a stiffness of the housing in a direction toward the expandable fluid region from an opposite edge of the electrode region. The housing having an increasing stiffness extending in a direction toward the expandable fluid region results in an end of the housing opposite the expandable fluid region being initially compressed when the electrode pair is actuated and zipping toward the expandable fluid region. The electrode pair is actuatable between a non-actuated state and an actuated state such that actuation from the non-actuated state to the actuated state directs the dielectric fluid into the expandable fluid region. This expands the expandable fluid region, raising a portion of the artificial muscle on demand. Various embodiments of the artificial muscle and the operation of the artificial muscle are described in more detail herein. Whenever possible, the same reference numerals will be used throughout the drawings to refer to the same or like parts.

Figure 1:
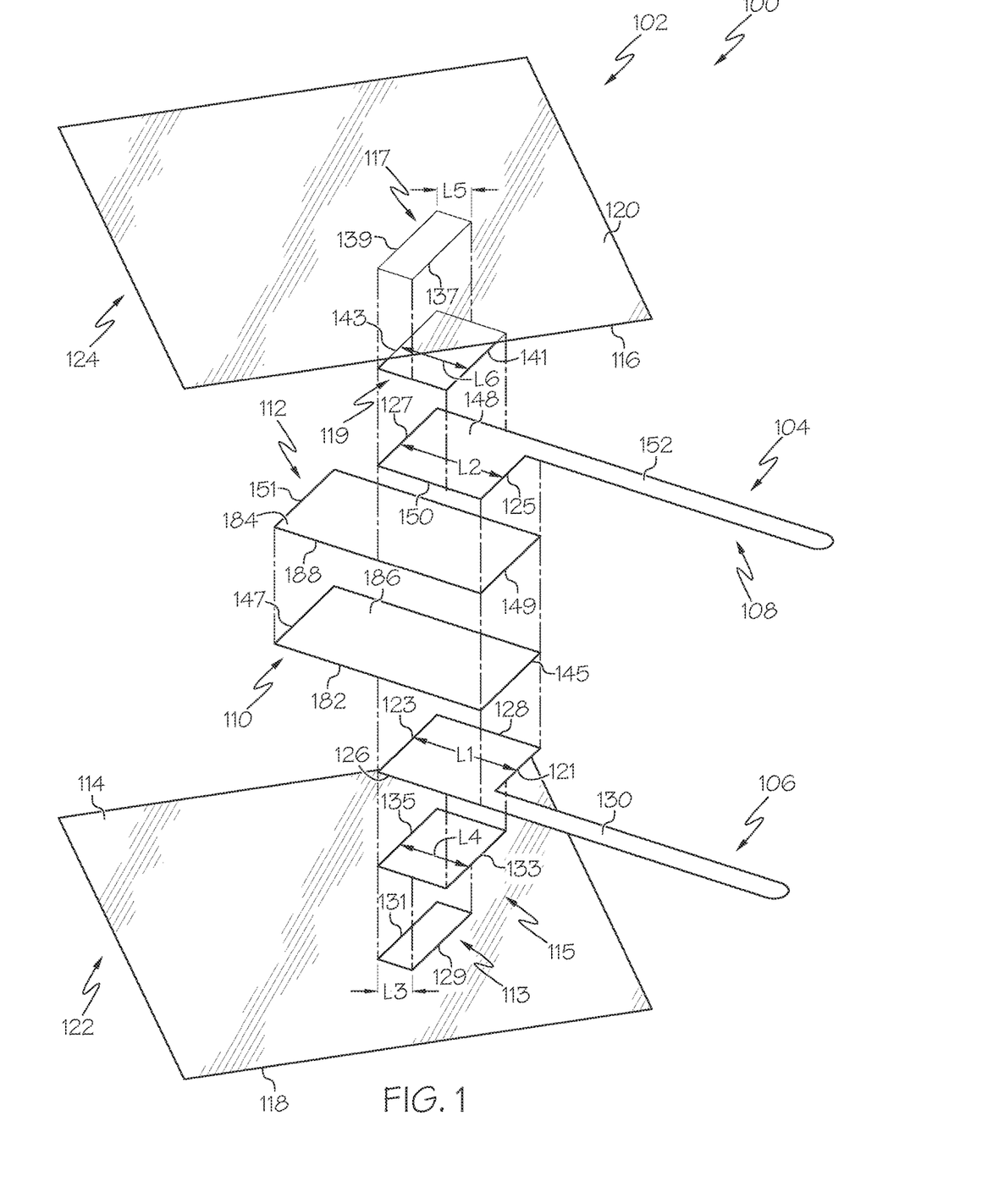
FIG. 1 schematically depicts an exploded view of an illustrative artificial muscle, according to one or more embodiments shown and described herein.

Referring now to FIGS. 1-4, an artificial muscle 100 is shown. As shown in FIG. 1, the artificial muscle 100 includes a housing 102, an electrode pair 104, including a first electrode 106 and a second electrode 108, a first electrical insulator layer 110 fixed to the first electrode 106, and a second electrical insulator layer 112 fixed to the second electrode 108. The artificial muscle 100 also includes one or more stiffening members positioned between the housing 102 and at least one of the first electrode 106 and the second electrode 108. As shown, a first stiffening member 113 and a second stiffening member 115 are positioned between the housing 102 and the first electrode 106, and a third stiffening member 117 and a fourth stiffening member 119 are positioned between the housing 102 and the second electrode 108.

In some embodiments, the housing 102 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 102 are heat-sealable. In other embodiments, the housing 102 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

Throughout the ensuing description, reference may be made to the housing 102 including the first film layer 122 and the second film layer 124, as opposed to the one-piece housing. However, it should be understood that either arrangement is contemplated. In some embodiments, the first film layer 122 and the second film layer 124 generally include the same structure and composition. For example, in some embodiments, the first film layer 122 and the second film layer 124 each comprises an elastomeric material. In some embodiments, the first film layer 122 and the second film layer 124 each comprises biaxially oriented polypropylene. In embodiments, each of the first film layer 122 and the second film layer 124 has a total thickness of from 1 mil to 5 mils, such as 1.5 mils, 2 mils, 2.5 mils, 3 mils, 3.5 mils, 4 mils, 4.5 mils, or any range having any of those two values as endpoints. Although not shown, each of the first film layer 122 and the second film layer 124 may comprise a pair of biaxially oriented polypropylene layers. In one example embodiment, each biaxially oriented polypropylene layer may have a thickness of 1.5 mils to provide the first film layer 122 and the second film layer 124 each with a total thickness of 3 mils.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 100 is negatively charged.

Figure 9:
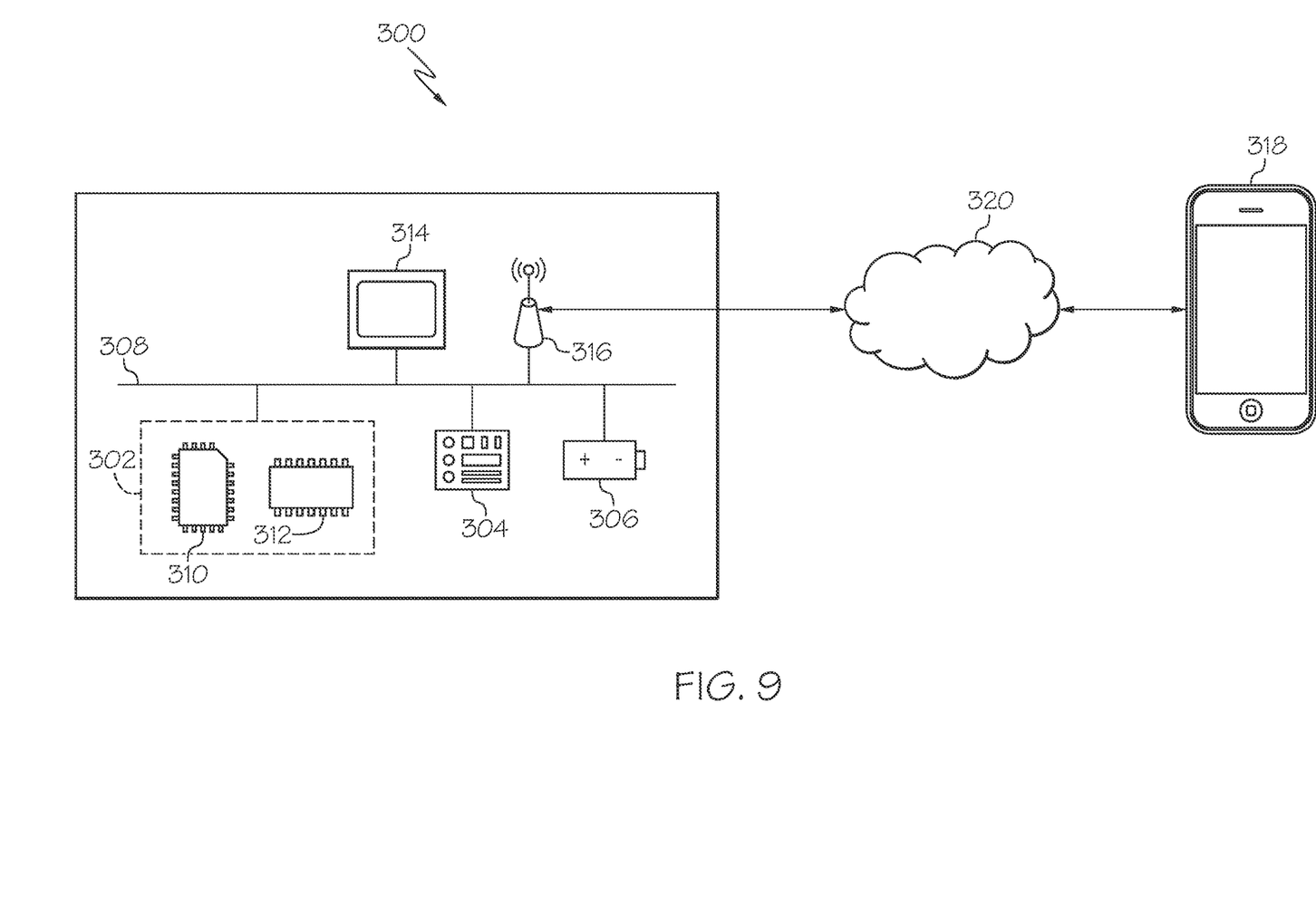
FIG. 9 schematically depicts an actuation system for operating the artificial muscles, according to one or more embodiments shown and described herein.

The first electrode 106 has a film-facing surface 126, an opposite inner surface 128, a first end 121, and an opposite second end 123. The first electrode 106 has a length L1 extending between the first end 121 and the second end 123. In addition, the first electrode 106 includes a first terminal 130 extending from the first end 121 of the first electrode 106 past an edge of the first film layer 122 such that the first terminal 130 can be connected to a power supply to actuate the first electrode 106. Specifically, the terminal 130 is coupled, either directly or in series, to a power supply and a controller of an actuation system 300, as shown in FIG. 9. Similarly, the second electrode 108 has a film-facing surface 148, an opposite inner surface 150, a first end 125, and an opposite second end 127. The second electrode 108 has a length L2 extending between the first end 125 and the second end 127. The second electrode 108 includes a second terminal 152 extending from the first end 125 of the second electrode 108 past an edge of the second film layer 124 such that the second terminal 152 can be connected to a power supply and a controller of the actuation system 300 to actuate the second electrode 108.

As noted above, the first stiffening member 113 and the second stiffening member 115 are provided between the first film layer 122 and the first electrode 106. As discussed in more detail herein, the first stiffening member 113 and the second stiffening member 115 provide a gradient stiffness to gradually or incrementally increase the stiffness of the first film layer 122, which results in a zipping movement of the first film layer 122 in a direction from the first end 121 of the first electrode 106 toward the second end 123 of the first electrode 106 when the electrode pair 104 is actuated. Specifically, the first stiffening member 113 has a first end 129 and an opposite second end 131 defining a length L3 therebetween. Additionally, the second stiffening member 115 has a first end 133 and an opposite second end 135 defining a length L4 therebetween. It should be appreciated that the length L1 of the first electrode 106 is greater than the length L3 of the first stiffening member 113. Additionally, the length L4 of the second stiffening member 115 is between the length L1 of the first electrode 106 and the length L3 of the first stiffening member 113. As shown, the first stiffening member 113 is positioned between the first film layer 122 and the second stiffening member 115, and the second stiffening member 115 is positioned between the first stiffening member 113 and the first electrode 106. Further, the second end 131 of the first stiffening member 113 and the second end 135 of the second stiffening member 115 are aligned with the second end 123 of the first electrode 106, when assembled.

With respect to the third stiffening member 117 and the fourth stiffening member 119, the third stiffening member 117 has a first end 137 and an opposite second end 139 defining a length L5 therebetween. Additionally, the fourth stiffening member 119 has a first end 141 and an opposite second end 143 defining a length L6 therebetween. It should be appreciated that the length L2 of the second electrode 108 is greater than the length L5 of the third stiffening member 117. Additionally, the length L6 of the fourth stiffening member 119 is between the length L2 of the second electrode 108 and the length L5 of the third stiffening member 117. As discussed in more detail herein, the third stiffening member 117 and the fourth stiffening member 119 provide a gradient stiffness to gradually or incrementally increase the stiffness of the second film layer 124, which results in a zipping movement of the second film layer 124 in a direction from the first end 125 of the second electrode 108 toward the second end 127 of the second electrode 108 when the electrode pair 104 is actuated. As shown, the third stiffening member 117 is positioned between the second film layer 124 and the fourth stiffening member 119, and the fourth stiffening member 119 is positioned between the third stiffening member 117 and the second electrode 108. Further, the second end 139 of the third stiffening member 117 and the second end 143 of the fourth stiffening member 119 are aligned with the second end 127 of the second electrode 108, when assembled.

In an example embodiment, the stiffening members 113, 115, 117, 119 are each biaxially oriented polypropylene layers having a thickness of from 1 mil to 2 mils, such as 1 mil, 1.5 mils, 2 mils, or any range having any of those two values as endpoints. In embodiments, only one of the first stiffening member 113 and the second stiffening member 115 is provided between the first film layer 122 and the first electrode 106. Further, in embodiments, the first stiffening member 113 and the second stiffening member 115 may be a one piece monolithic member such that a thickness of the monolithic member at a first end thereof is less than a thickness of the monolithic member at an opposite second end thereof. The thickness may gradually increase or incrementally increase in a length direction toward the second end from the first end, such as toward the second end 123 of the first electrode 106. Similarly, in embodiments, only one of the third stiffening member 117 and the fourth stiffening member 119 is provided between the second film layer 124 and the second electrode 108. Further, in embodiments, the third stiffening member 117 and the fourth stiffening member 119 may be a one piece monolithic member such that a thickness of the monolithic member at a first end thereof is less than a thickness of the monolithic member at an opposite second end thereof. The thickness may gradually increase or incrementally increase in a length direction toward the second end from the first end, such as toward the second end 127 of the second electrode 108.

Referring still to FIG. 1, the first electrical insulator layer 110 has a first end 145 and an opposite second end 147. Similarly, the second electrical insulator layer 112 has a first end 149 and an opposite second end 151. The first end 145 of the first electrical insulator layer 110 and the first end 149 of the second electrical insulator layer 112 are each aligned with the first end 121 of the first electrode 106 and the first end 125 of the second electrode 108, when assembled. It should be appreciated that, in some embodiments, the first electrical insulator layer 110 and the second electrical insulator layer 112 generally include the same structure and composition. As such, in some embodiments, the first electrical insulator layer 110 and the second electrical insulator layer 112 each include an adhesive surface 182, 184 and an opposite non-sealable surface 186, 188, respectively. Thus, in some embodiments, the first electrical insulator layer 110 and the second electrical insulator layer 112 are each a polymer tape adhered to the inner surface 128 of the first electrode 106 and the inner surface 150 of the second electrode 108, respectively.

Figure 2:
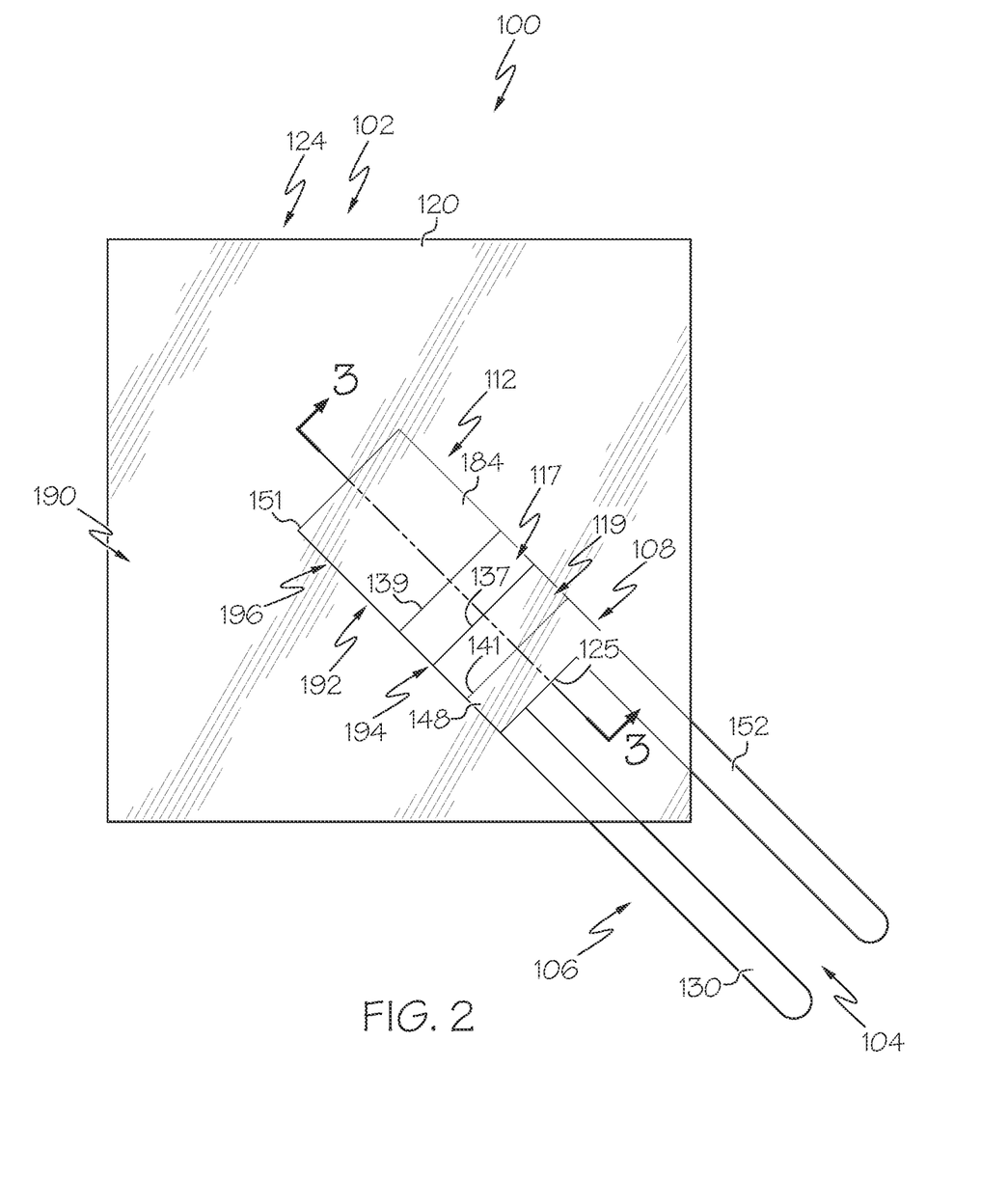
FIG. 2 schematically depicts a top plan view of the artificial muscle of FIG. 1, according to one or more embodiments shown and described herein.

Referring now to FIG. 2, a top plan view of the artificial muscle 100 is shown in its assembled form with the first terminal 130 of the first electrode 106 and the second terminal 152 of the second electrode 108 extending past an outer perimeter of the housing 102, i.e., the first film layer 122 and the second film layer 124. As shown, the second electrode 108 is stacked on top of the first electrode 106 and, therefore, only the second film layer 124, the third stiffening member 117, the fourth stiffening member 119, and the second electrode 108 are illustrated as the other components are hidden from this view.

Figure 3:
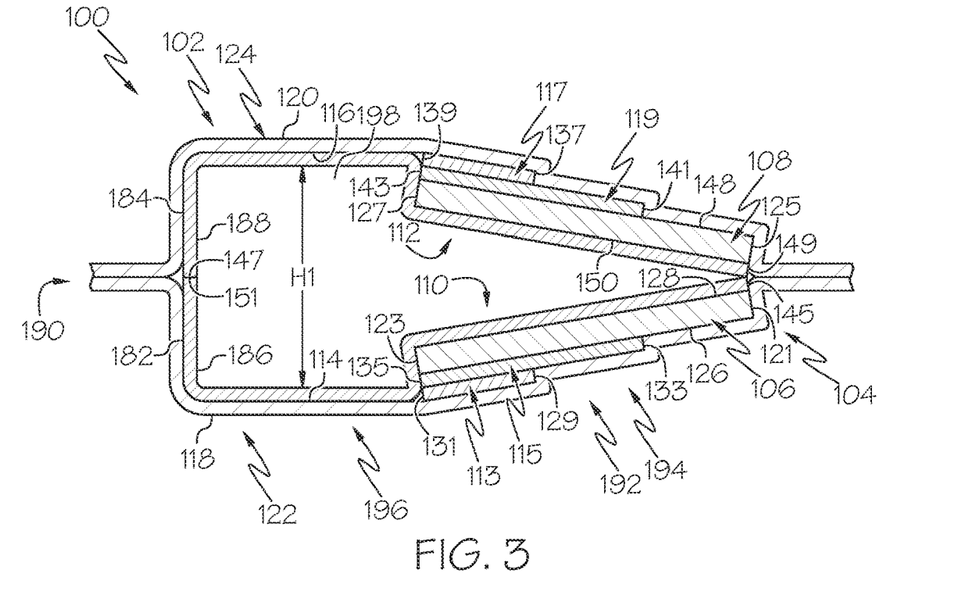
FIG. 3 schematically depicts a cross-sectional view of the artificial muscle of FIG. 1 taken along line 3-3 in FIG. 2 in a non-actuated state, according to one or more embodiments shown and described herein.

Referring now to FIG. 3, in its assembled form, the first electrode 106, the second electrode 108, the first electrical insulator layer 110, and the second electrical insulator layer 112 are sandwiched between the first film layer 122 and the second film layer 124. Additionally, the first stiffening member 113 and the second stiffening member 115 are positioned between the first film layer 122 and the first electrode 106, and the third stiffening member 117 and the fourth stiffening member 119 are positioned between the second film layer 124 and the second electrode 108. The first film layer 122 is partially sealed to the second film layer 124 at an area surrounding the first electrical insulator layer 110 and the second electrical insulator layer 112. Specifically, the first film layer 122 is sealed to the second film layer 124 to define a sealed portion 190 surrounding the first electrical insulator layer 110 and the second electrical insulator layer 112. In some embodiments, the first film layer 122 is heat-sealed to the second film layer 124. However, the first film layer 122 and the second film layer 124 may be sealed in any suitable manner, such as using an adhesive or the like.

The first electrical insulator layer 110 and the second electrical insulator layer 112 provide a barrier that prevents a portion of the first film layer 122 from sealing to an opposite portion of the second film layer 124, thereby forming an unsealed portion 192. The unsealed portion 192 of the housing 102 includes an electrode region 194, in which the electrode pair 104 is provided, and an expandable fluid region 196, which is adjacent the electrode region 194. Although not shown, the housing 102 may be cut to conform to the geometry of the first electrical insulator layer 110 and the second electrical insulator layer 112, and reduce the size of the artificial muscle 100, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 100 using a needle or other suitable injection device.

Figure 4:
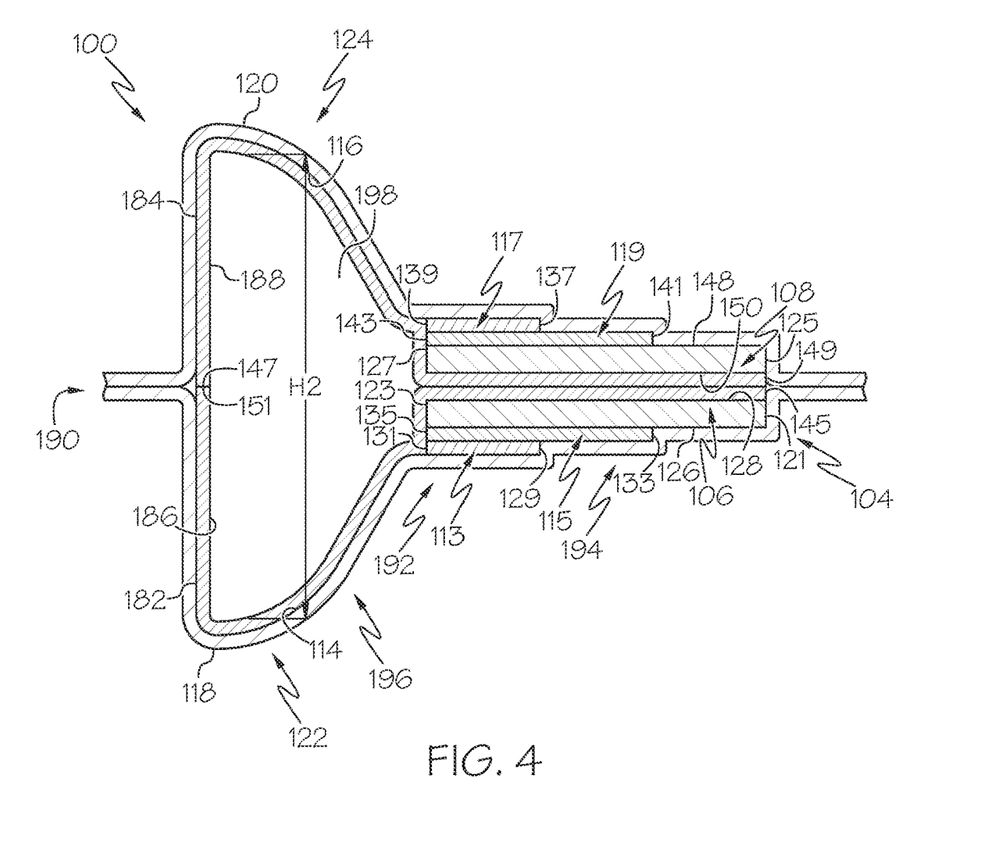
FIG. 4 schematically depicts a cross-sectional view of the artificial muscle of FIG. 1 in an actuated state, according to one or more embodiments shown and described herein.

The artificial muscle 100 is actuatable between a non-actuated state and an actuated state. In the non-actuated state, as shown in FIG. 3, the first electrode 106 and the second electrode 108 are partially spaced apart from one another proximate the second end 123 of the first electrode 106 and the second end 127 of the second electrode 108. The first end 121 of the first electrode 106 and the first end 125 of the second electrode 108 remain in position relative to one another due to the housing 102 being sealed. In the actuated state, as shown in FIG. 4, the first electrode 106 and the second electrode 108 are brought into contact with and oriented parallel to one another to force the dielectric fluid 198 into the expandable fluid region 196. This causes the dielectric fluid 198 to flow into and inflate the expandable fluid region 196. Specifically, it should be appreciated that the first stiffening member 113 and the second stiffening member 115 cause the first film layer 122 to become increasingly more rigid within the electrode region 194 in a direction toward the expandable fluid region 196. Similarly, the third stiffening member 117 and the fourth stiffening member 119 cause the second film layer 124 to become increasingly more rigid within the electrode region 194 in a direction toward the expandable fluid region 196. As such, during actuation of the electrode pair 104, the least rigid portion of the first film layer 122 and the second film layer 124, i.e., those portions without any stiffening members 113, 115, 117, 119 are initially attracted toward one another by actuation of the electrode pair 104. Subsequently, an adjacent portion of the first film layer 122 and the second film layer 124 having a stiffness greater than the least rigid portion, i.e., those portions including only the second stiffening member 115 or the fourth stiffening member 119 therebetween, is attracted toward one another. Lastly, the remaining portion of the first film layer 122 and the second film layer 124 having the greatest stiffness, i.e., those portions including each of the stiffening members 113, 115, 117, 119 therebetween, is attracted toward one another, as shown in FIG. 4. It should be appreciated that the increasing stiffness of the first film layer 122 and the second film layer 124 in a direction toward the expandable fluid region 196 facilitates the electrodes "zipping" from the first end 121 of the first electrode 106 and the first end 125 of the second electrode 108 toward the second end 123 of the first electrode 106 and the second end 127 of the second electrode 108.

Referring again to FIG. 3, the artificial muscle 100 is shown in the non-actuated state. The electrode pair 104 is provided within the electrode region 194 of the unsealed portion 192 of the housing 102. In the non-actuated state, the first electrode 106 and the second electrode 108 are partially spaced apart from and non-parallel to one another. Due to the first film layer 122 being sealed to the second film layer 124, the first end 121 of the first electrode 106 and the first end 125 of the second electrode 108 are brought into contact with one another. Thus, dielectric fluid 198 is provided between the first electrode 106 and the second electrode 108, thereby separating the second end 123 of the first electrode 106 and the second end 127 of the second electrode 108 proximate the expandable fluid region 196. Stated another way, a distance between the second end 123 of the first electrode 106 and the second end 156 of the second electrode 108 is greater than a distance between the first end 121 of the first electrode 106 and the first end 125 of the second electrode 108. In some embodiments, the first electrode 106 and the second electrode 108 may be flexible. In the non-actuated state, the expandable fluid region 196 has a height H1.

When actuated, as shown in FIG. 4, the first electrode 106 and the second electrode 108 zipper toward one another, as discussed above, from the first end 121 of the first electrode 106 and the first end 125 of the second electrode 108 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a height H2, which is greater than the height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by a power supply. In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 110 to deform and causes the second film layer 124 and the second electrical insulator layer 112 to deform in an opposite second axial direction. Once the voltage being supplied to the first electrode 106 and the second electrode 108 is discontinued, the first electrode 106 and the second electrode 108 return to their initial, non-parallel position in the non-actuated state.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by a difference in the length of the first electrical insulator layer 110 and the second electrical insulator layer 112 compared to the length L1 of the first electrode 106 and the length L2 of the second electrode 108. Thus, the degree of displacement within the expandable fluid region 196 may alternatively, or in addition, be controlled by increasing or reducing the length of the first electrical insulator layer 110 and the second electrical insulator layer 112.

Figure 5:
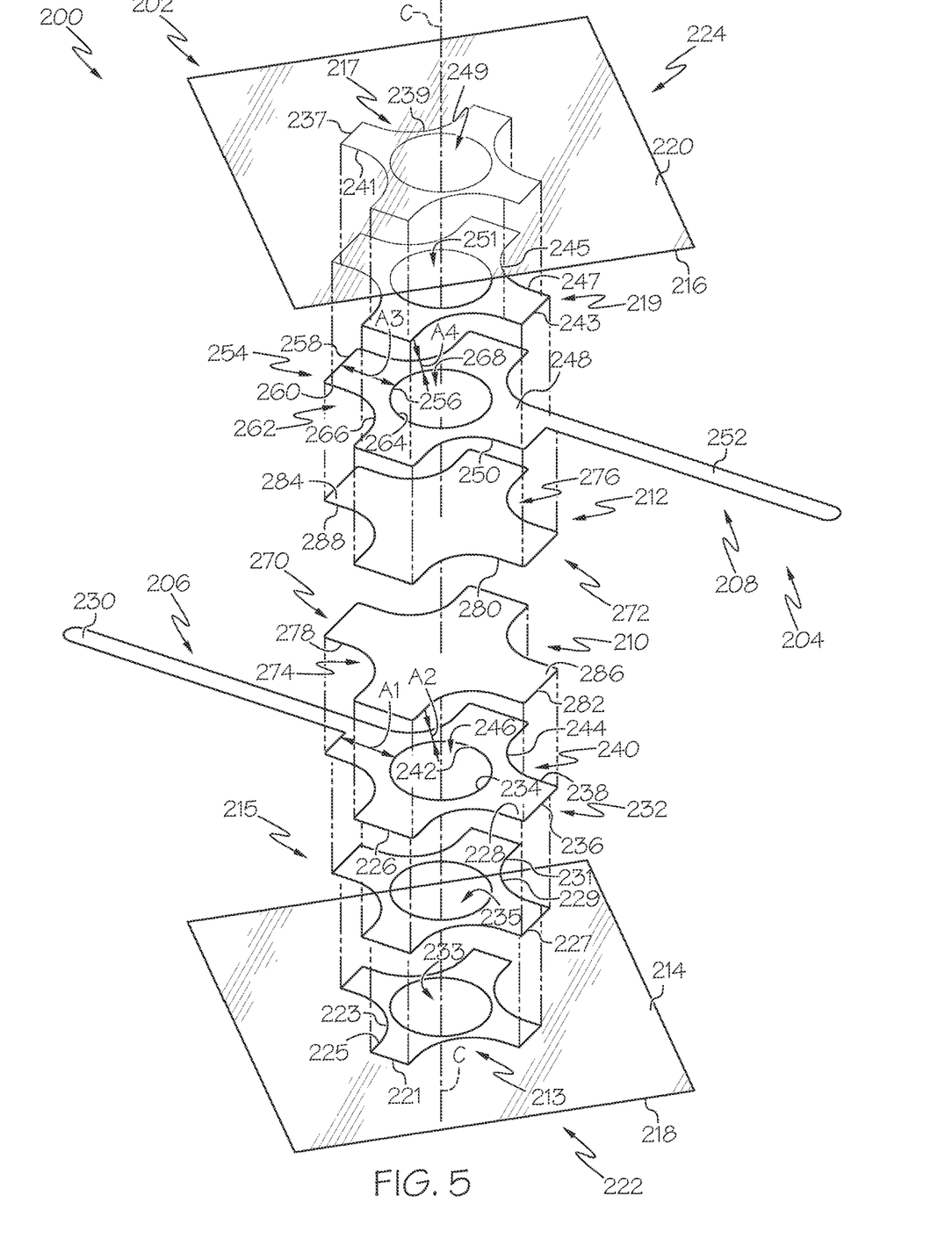
FIG. 5 schematically depicts an exploded view of an illustrative artificial muscle, according to one or more embodiments shown and described herein.

Referring now to FIGS. 5-8, an artificial muscle 200 is shown. As shown in FIG. 5, the artificial muscle 200 is substantially similar to the artificial muscle 100 discussed herein, except the individual layers have a generally plus-shaped geometry. As such, the artificial muscle 200 includes a housing 202, an electrode pair 204, including a first electrode 206 and a second electrode 208, a first electrical insulator layer 210 fixed to the first electrode 206, and a second electrical insulator layer 212 fixed to the second electrode 208. The artificial muscle 200 also includes one or more stiffening members positioned between the housing 202 and at least one of the first electrode 206 and the second electrode 208. As shown, a first stiffening member 213 and a second stiffening member 215 are positioned between the housing 202 and the first electrode 206, and a third stiffening member 217 and a fourth stiffening member 219 are positioned between the housing 202 and the second electrode 208.

In some embodiments, the housing 202 is a one-piece monolithic layer including a pair of opposite inner surfaces, such as a first inner surface 214 and a second inner surface 216, and a pair of opposite outer surfaces, such as a first outer surface 218 and a second outer surface 220. In some embodiments, the first inner surface 214 and the second inner surface 216 of the housing 202 are heat-sealable. In other embodiments, the housing 202 may be a pair of individually fabricated film layers, such as a first film layer 222 and a second film layer 224. Thus, the first film layer 222 includes the first inner surface 214 and the first outer surface 218, and the second film layer 224 includes the second inner surface 216 and the second outer surface 220.

Throughout the ensuing description, reference may be made to the housing 202 including the first film layer 222 and the second film layer 224, as opposed to the one-piece housing. It should be understood that either arrangement is contemplated. In some embodiments, the first film layer 222 and the second film layer 224 generally include the same structure and composition. For example, in some embodiments, the first film layer 222 and the second film layer 224 each comprises biaxially oriented polypropylene. In embodiments, each of the first film layer 222 and the second film layer 232 has a total thickness of 3 mils. Although not shown, each of the first film layer 222 and the second film layer 232 may comprise a pair of biaxially oriented polypropylene layers. In embodiments, each biaxially oriented polypropylene layer has a thickness of from 1 mil to 2 mils, such as 1 mil, 1.5 mils, 2 mils, or any range having any of those two values as endpoints. In embodiments, each biaxially oriented polypropylene layer has a thickness of 1.5 mils to provide the first film layer 222 and the second film layer 232 each with a total thickness of 3 mils.

The first electrode 206 and the second electrode 208 are each positioned between the first film layer 222 and the second film layer 224. In some embodiments, the first electrode 206 and the second electrode 208 are each aluminum-coated polyester such as, for example, Mylar®. In addition, one of the first electrode 206 and the second electrode 208 is a negatively charged electrode and the other of the first electrode 206 and the second electrode 208 is a positively charged electrode. For purposes discussed herein, either electrode 206, 208 may be positively charged so long as the other electrode 206, 208 of the artificial muscle 200 is negatively charged.

The first electrode 206 has a film-facing surface 226 and an opposite inner surface 228. In addition, the first electrode 206 includes a first terminal 230 extending from the first electrode 206 past an edge of the first film layer 222 such that the first terminal 230 can be connected to a power supply to actuate the first electrode 206. Specifically, the terminal is coupled, either directly or in series, to a power supply and a controller of an actuation system 300, as shown in FIG. 9. Similarly, the second electrode 208 has a film-facing surface 248 and an opposite inner surface 250. The second electrode 208 includes a second terminal 252 extending from the second electrode 208 past an edge of the second film layer 224 such that the second terminal 252 can be connected to a power supply and a controller of the actuation system 300 to actuate the second electrode 208.

The first electrode 206 includes two or more tab portions 232 and two or more bridge portions 240. Each bridge portion 240 is positioned between adjacent tab portions 232, interconnecting these adjacent tab portions 232. Each tab portion 232 has a first end 234 extending radially from a center axis C of the first electrode 206 to an opposite second end 236 of the tab portion 232, where the second end 236 defines a portion of an outer perimeter 238 of the first electrode 206. Each bridge portion 240 has a first end 242 extending radially from the center axis C of the first electrode 206 to an opposite second end 244 of the bridge portion 240 defining another portion of the outer perimeter 238 of the first electrode 206. Each tab portion 232 has a tab length A1 and each bridge portion 240 has a bridge length A2 extending in a radial direction from the center axis C of the first electrode 206. The tab length A1 defines a distance from the first end 234 to the second end 236 of the tab portion 232 and the bridge length A2 defines a distance from the first end 242 to the second end 244 of the bridge portion 240. The tab length A1 of each tab portion 232 is longer than the bridge length A2 of each bridge portion 240. In some embodiments, the bridge length A2 is 20% to 50% of the tab length A1, such as 30% to 40% of the tab length A1.

In some embodiments, the two or more tab portions 232 are arranged in one or more pairs of tab portions 232. Each pair of tab portions 232 includes two tab portions 232 arranged diametrically opposed to one another. In some embodiments, the first electrode 206 may include only two tab portions 232 positioned on opposite sides or ends of the first electrode 206. In some embodiments, as shown in FIG. 5, the first electrode 206 includes four tab portions 232 and four bridge portions 240 interconnecting adjacent tab portions 232. In this embodiment, the four tab portions 232 are arranged as two pairs of tab portions 232 diametrically opposed to one another. Furthermore, as shown, the first terminal 230 extends from the second end 236 of one of the tab portions 232 and is integrally formed therewith.

Like the first electrode 206, the second electrode 208 includes at least a pair of tab portions 254 and two or more bridge portions 262. Each bridge portion 262 is positioned between adjacent tab portions 254, interconnecting these adjacent tab portions 254. Each tab portion 254 has a first end 256 extending radially from a center axis C of the second electrode 208 to an opposite second end 258 of the tab portion 254, where the second end 258 defines a portion of an outer perimeter 260 of the second electrode 208. Due to the first electrode 206 and the second electrode 108 being coaxial with one another, the center axis C of the first electrode 106 and center axis C of the second electrode 108 are the same. Each bridge portion 262 has a first end 264 extending radially from the center axis C of the second electrode 208 to an opposite second end 266 of the bridge portion 262 defining another portion of the outer perimeter 260 of the second electrode 208. Each tab portion 254 has a tab length A3 and each bridge portion 262 has a bridge length A4 extending in a radial direction from the center axis C of the second electrode 208. The tab length A3 defines a distance from the first end 256 to the second end 258 of the tab portion 254 and the bridge length A4 defines a distance from the first end 264 to the second end 266 of the bridge portion 262. The tab length A3 is longer than the bridge length A4 of each bridge portion 262. In some embodiments, the bridge length A4 is 20% to 50% of the tab length A3, such as 30% to 40% of the tab length A3.

In some embodiments, the two or more tab portions 254 are arranged in one or more pairs of tab portions 254. Each pair of tab portions 254 includes two tab portions 254 arranged diametrically opposed to one another. In some embodiments, the second electrode 208 may include only two tab portions 254 positioned on opposite sides or ends of the first electrode 206. In some embodiments, as shown in FIG. 5, the second electrode 208 includes four tab portions 254 and four bridge portions 262 interconnecting adjacent tab portions 254. In this embodiment, the four tab portions 254 are arranged as two pairs of tab portions 254 diametrically opposed to one another. Furthermore, as shown, the second terminal 252 extends from the second end 258 of one of the tab portions 254 and is integrally formed therewith.

Referring still to FIG. 5, at least one of the first electrode 206 and the second electrode 208 has a central opening formed therein between the first end 234 of the tab portions 232 and the first end 242 of the bridge portions 240. As shown, the first electrode 206 has a central opening 246. However, it should be understood that the first electrode 206 does not need to include the central opening 246 when the central opening 268 is provided within the second electrode 208. Alternatively, the second electrode 208 does not need to include the central opening 268 when the central opening 246 is provided within the first electrode 206.

As noted above, the first stiffening member 213 and the second stiffening member 215 are provided between the first film layer 222 and the first electrode 206. As discussed in more detail herein, the first stiffening member 213 and the second stiffening member 215 provide a gradient stiffness to gradually or incrementally increase the stiffness of the first film layer 222. As shown, the first stiffening member 213 is positioned between the first film layer 222 and the second stiffening member 215, and the second stiffening member 215 is positioned between the first stiffening member 213 and the first electrode 206.

The first stiffening member 213 and the second stiffening member 215 each have a geometry generally corresponding to the first electrode 206. Thus, the first stiffening member 213 includes tab portions 221 and bridge portions 223 extending between adjacent tab portions 221 defining an outer perimeter 225. Similarly, the second stiffening member 215 includes tab portions 227 and bridge portions 229 extending between adjacent tab portions 227 defining an outer perimeter 231. However, the first stiffening member 213 and the second stiffening member 215 are dimensionally smaller than the first electrode 206. Specifically, the second stiffening member 215 is dimensionally smaller than the first electrode 206, and the first stiffening member 213 is dimensionally smaller than the second stiffening member 215. In embodiments in which the first electrode 206 has the central opening 246, the first stiffening member 213 has a central opening 233 and the second stiffening member 215 has a central opening 235, each coaxial with the central opening 246 of the first electrode 206.

With respect to the third stiffening member 217 and the fourth stiffening member 219, as noted above, the third stiffening member 217 and the fourth stiffening member 219 are provided between the second film layer 224 and the second electrode 208. As discussed in more detail herein, the third stiffening member 217 and the fourth stiffening member 219 provide a gradient stiffness to gradually or incrementally increase the stiffness of the second film layer 224. As shown, the third stiffening member 217 is positioned between the second film layer 224 and the fourth stiffening member 219, and the fourth stiffening member 219 is positioned between the third stiffening member 217 and the second electrode 208.

The third stiffening member 217 and the fourth stiffening member 219 each have a geometry generally corresponding to the second electrode 208. Thus, the third stiffening member 217 includes tab portions 237 and bridge portions 239 extending between adjacent tab portions 237 defining an outer perimeter 241. Similarly, the fourth stiffening member 219 includes tab portions 243 and bridge portions 245 extending between adjacent tab portions 243 defining an outer perimeter 247. However, the third stiffening member 217 and the fourth stiffening member 219 are dimensionally smaller than the second electrode 208. Specifically, the fourth stiffening member 219 is dimensionally smaller than the second electrode 208, and the third stiffening member 217 is dimensionally smaller than the fourth stiffening member 219. In embodiments in which the second electrode 208 has the central opening 268, the third stiffening member 217 has a central opening 249 and the fourth stiffening member 219 has a central opening 251, each coaxial with the central opening 268 of the second electrode 208.

In embodiments, the stiffening members 213, 215, 217, 219 are each biaxially oriented polypropylene layers having a thickness of from 1 mil to 2 mils, such as 1 mil, 1.5 mils, 2 mils, or any range having any of those two values as endpoints. In embodiments, only one of the first stiffening member 213 and the second stiffening member 215 is provided between the first film layer 222 and the first electrode 206. Further, in embodiments, the first stiffening member 213 and the second stiffening member 215 may be a one piece monolithic member such that a thickness of the monolithic member at an end opposite a central opening is less than a thickness of the monolithic member at the central opening. The thickness may gradually increase or incrementally increase in a length direction toward the central opening from the opposite end. Similarly, in embodiments, only one of the third stiffening member 217 and the fourth stiffening member 219 is provided between the second film layer 224 and the second electrode 208. Further, in embodiments, the third stiffening member 217 and the fourth stiffening member 219 may be a one piece monolithic member such that a thickness of the monolithic member at an end opposite a central opening is less than a thickness of the monolithic member at an the central opening. The thickness may gradually increase or incrementally increase in a length direction toward the central opening from the opposite end.

Referring still to FIG. 5, the first electrical insulator layer 210 and the second electrical insulator layer 212 have a geometry generally corresponding to the first electrode 206 and the second electrode 208, respectively. Thus, the first electrical insulator layer 210 and the second electrical insulator layer 212 each have tab portions 270, 272 and bridge portions 274, 276 corresponding to like portions on the first electrode 206 and the second electrode 208. Further, the first electrical insulator layer 210 and the second electrical insulator layer 212 each have an outer perimeter 278, 280 corresponding to the outer perimeter 238 of the first electrode 206 and the outer perimeter 260 of the second electrode 208, respectively, when positioned thereon.

It should be appreciated that, in some embodiments, the first electrical insulator layer 210 and the second electrical insulator layer 212 generally include the same structure and composition. As such, in some embodiments, the first electrical insulator layer 210 and the second electrical insulator layer 212 each include an adhesive surface 282, 284 and an opposite non-sealable surface 286, 288, respectively. Thus, in some embodiments, the first electrical insulator layer 210 and the second electrical insulator layer 212 are each a polymer tape adhered to the inner surface 228 of the first electrode 206 and the inner surface 250 of the second electrode 208, respectively.

Figure 6:
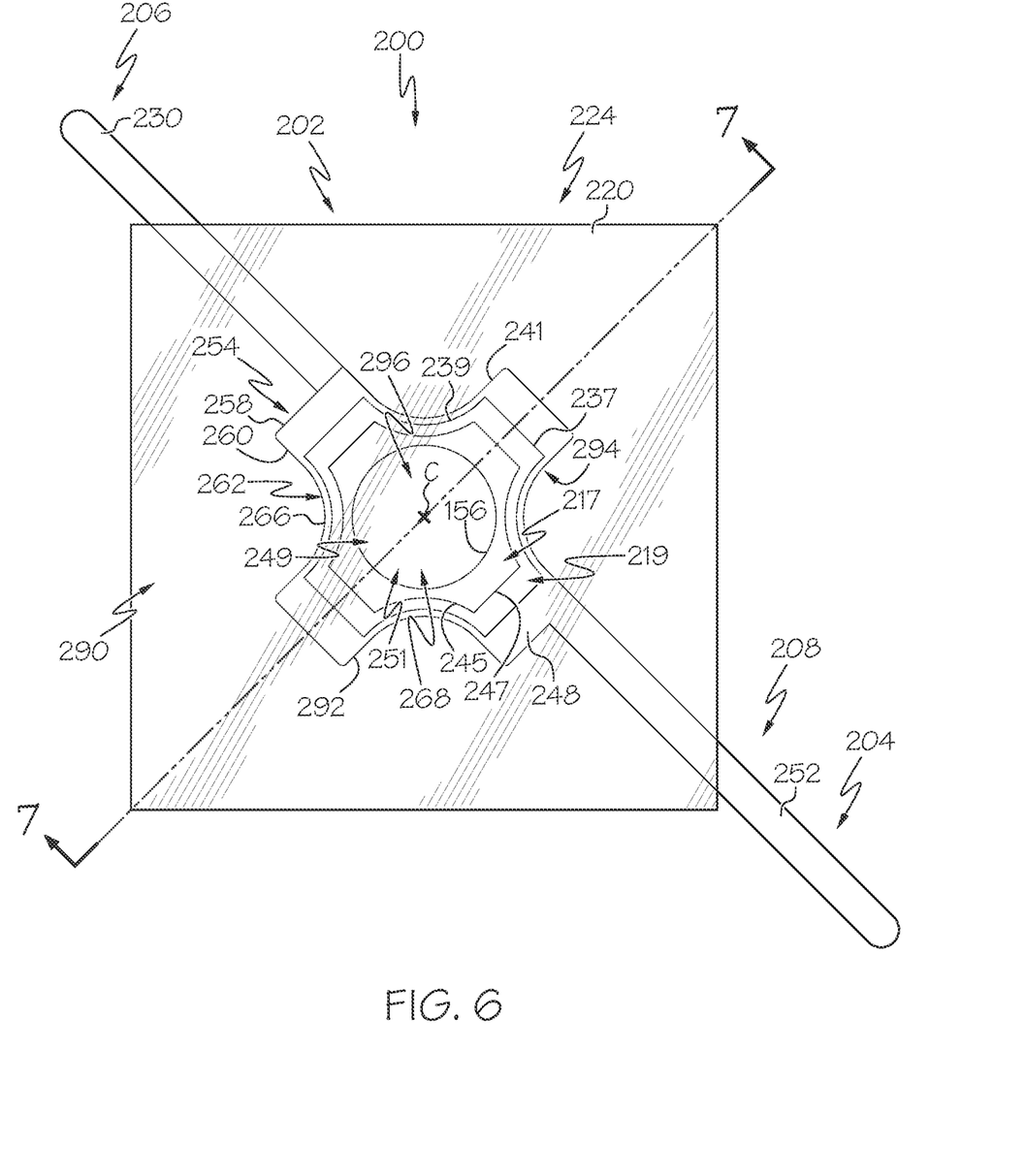
FIG. 6 schematically depicts a top plan view of the artificial muscle of FIG. 5, according to one or more embodiments shown and described herein.

Referring now to FIG. 6, a top plan view of the artificial muscle 200 is shown in its assembled form with the first terminal 230 of the first electrode 206 and the second terminal 252 of the second electrode 208 extending past an outer perimeter of the housing 202, i.e., the first film layer 222 and the second film layer 224. As shown, the second electrode 208 is stacked on top of the first electrode 206 and, therefore, only the second film layer 224, the third stiffening member 217, the fourth stiffening member 219, and the second electrode 208 are illustrated as the other components are hidden from this view.

Figure 7:
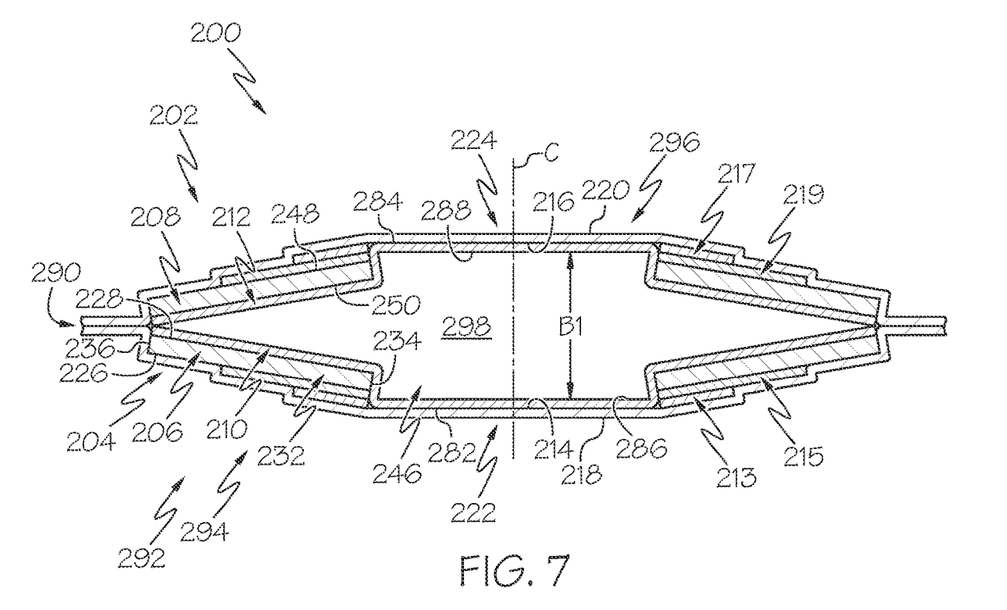
FIG. 7 schematically depicts a cross-sectional view of the artificial muscle of FIG. 5 taken along line 7-7 in FIG. 6 in a non-actuated state, according to one or more embodiments shown and described herein.

Referring now to FIG. 7, in its assembled form, the first electrode 206, the second electrode 208, the first electrical insulator layer 210, and the second electrical insulator layer 212 are sandwiched between the first film layer 222 and the second film layer 224. Additionally, the first stiffening member 213 and the second stiffening member 215 are positioned between the first film layer 222 and the first electrode 206, and the third stiffening member 217 and the fourth stiffening member 219 are positioned between the second film layer 224 and the second electrode 208. The first film layer 222 is partially sealed to the second film layer 224 at an area surrounding the outer perimeter 238 of the first electrode 206 and the outer perimeter 260 of the second electrode 208. Specifically, in some embodiments, the first film layer 222 is sealed to the second film layer 224 to define a sealed portion 290 surrounding the first electrode 206 and the second electrode 208. In some embodiments, the first film layer 222 is heat-sealed to the second film layer 224. However, the first film layer 222 and the second film layer 224 may be sealed in any suitable manner, such as using an adhesive or the like.

The first electrical insulator layer 210 and the second electrical insulator layer 212 provide a barrier that prevents a portion of the first film layer 222 from sealing to an opposite portion the second film layer 224, thereby forming an unsealed portion 292. The unsealed portion 292 of the housing 202 includes an electrode region 294, in which the electrode pair 204 is provided, and an expandable fluid region 296, which is surrounded by the electrode region 294. The central openings 246, 268 of the first electrode 206 and the second electrode 208, as well as the central openings of the stiffening members, define the expandable fluid region 296 and are arranged to be axially stacked on one another. Although not shown, the housing 202 may be cut to conform to the geometry of the first electrical insulator layer 210 and the second electrical insulator layer 212, and reduce the size of the artificial muscle 200, namely, the size of the sealed portion 290.

Figure 8:
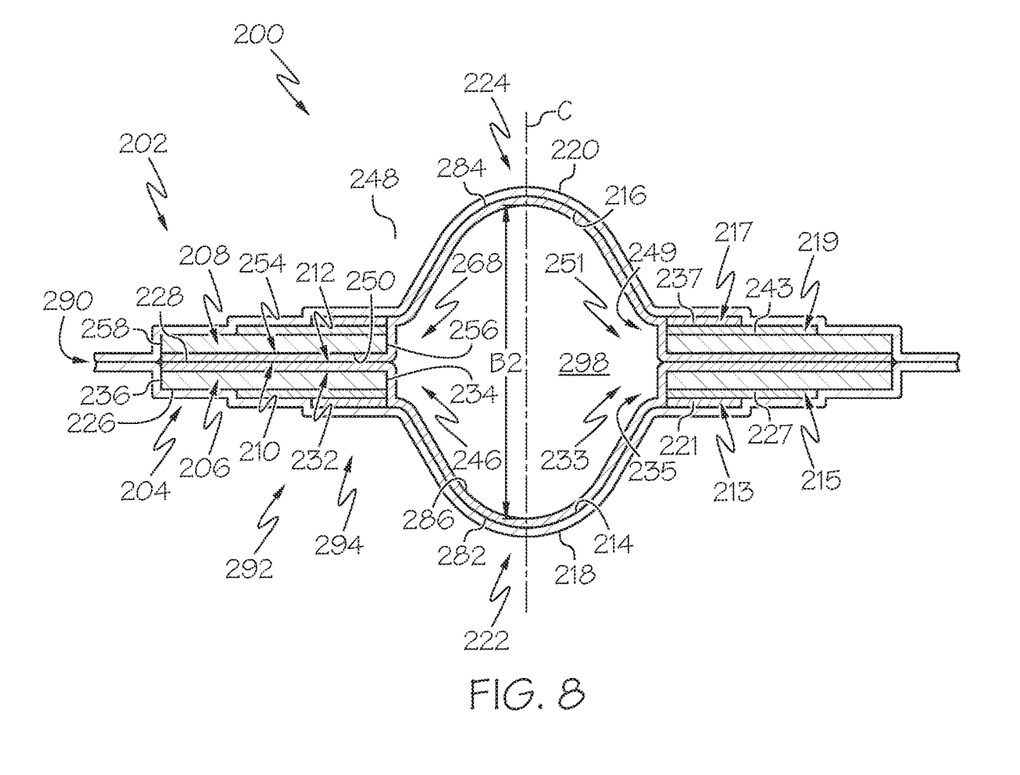
FIG. 8 schematically depicts a cross-sectional view of the artificial muscle of FIG. 5 in an actuated state, according to one or more embodiments shown and described herein.

A dielectric fluid 298, such as the dielectric fluid 198, is provided within the unsealed portion 292 and flows freely between the first electrode 206 and the second electrode 208. Similar to the artificial muscle 100 discussed herein, the artificial muscle 200 is actuatable between a non-actuated state and an actuated state. In the non-actuated state, as shown in FIG. 7, the first electrode 206 and the second electrode 208 are partially spaced apart from one another proximate the central openings 246, 268 thereof and the first end 234, 256 of the tab portions 232, 254. The second end 236, 258 of the tab portions 232, 254 remain in position relative to one another due to the housing 202 being sealed at the outer perimeter 238 of the first electrode 206 and the outer perimeter 260 of the second electrode 208. In the actuated state, as shown in FIG. 8, the first electrode 206 and the second electrode 208 are brought into contact with and oriented parallel to one another to force the dielectric fluid 298 into the expandable fluid region 296. This causes the dielectric fluid 298 to flow through the central openings 246, 268 of the first electrode 206 and the second electrode 208 and inflate the expandable fluid region 296. Specifically, it should be appreciated that the first stiffening member 213 and the second stiffening member 215 cause the first film layer 222 to become increasingly more rigid within the electrode region 294 in a direction toward the expandable fluid region 296. Similarly, the third stiffening member 217 and the fourth stiffening member 219 cause the second film layer 224 to become increasingly more rigid within the electrode region 294 in a direction toward the expandable fluid region 296. As such, during actuation of the electrode pair 204, the least rigid portion of the first film layer 222 and the second film layer 224, i.e., those portions without any stiffening members 213, 215, 217, 219, are initially attracted toward one another by actuation of the electrode pair 204. Subsequently, an adjacent portion of the first film layer 222 and the second film layer 224 having a stiffness greater than the least rigid portion, i.e., those portions including only the second stiffening member 215 or the fourth stiffening member 219 therebetween, is attracted toward one another. Lastly, the remaining portion of the first film layer 222 and the second film layer 224 having the greatest stiffness, i.e., those portions including each of the stiffening members 213, 215, 217, 219 therebetween, is attracted toward one another, as shown in FIG. 8. It should be appreciated that the increasing stiffness of the first film layer 222 and the second film layer 224 in a direction toward the expandable fluid region 296 facilitates the electrodes "zipping" from the second ends 236, 258 of the tab portions 232, 254 of the first electrode 206 and the second electrode 208 toward the first ends 234, 256 of the tab portions 232, 254 of the first electrode 206 and the second electrode 208.

Referring now to FIG. 7, the artificial muscle 200 is shown in the non-actuated state. The electrode pair 204 is provided within the electrode region 294 of the unsealed portion 292 of the housing 202. The central opening 246 of the first electrode 206 and the central opening 268 of the second electrode 208 are coaxially aligned within the expandable fluid region 296. In the non-actuated state, the first electrode 206 and the second electrode 208 are partially spaced apart from and non-parallel to one another. Due to the first film layer 222 being sealed to the second film layer 224 around the electrode pair 204, the second end 236, 258 of the tab portions 232, 254 are brought into contact with one another. Thus, dielectric fluid 298 is provided between the first electrode 206 and the second electrode 208, thereby separating the first end 234, 256 of the tab portions 232, 254 proximate the expandable fluid region 196. Stated another way, a distance between the first end 234 of the tab portion 232 of the first electrode 206 and the first end 256 of the tab portion 254 of the second electrode 208 is greater than a distance between the second end 236 of the tab portion 232 of the first electrode 206 and the second end 258 of the tab portion 254 of the second electrode 208. In some embodiments, the first electrode 206 and the second electrode 208 may be flexible. Thus, as shown in FIG. 7, the first electrode 206 and the second electrode 208 are convex such that the second ends 236, 258 of the tab portions 232, 254 thereof may remain close to one another, but spaced apart from one another proximate the central openings 246, 268. In the non-actuated state, the expandable fluid region 296 has a height B1.

When actuated, as shown in FIG. 8, the first electrode 206 and the second electrode 208 zipper toward one another from the second ends 244, 258 of the tab portions 232, 254 thereof, thereby pushing the dielectric fluid 298 into the expandable fluid region 296. As shown, when in the actuated state, the first electrode 206 and the second electrode 208 are parallel to one another. In the actuated state, the dielectric fluid 298 flows into the expandable fluid region 296 to inflate the expandable fluid region 296. As such, the first film layer 222 and the second film layer 224 expand in opposite directions. In the actuated state, the expandable fluid region 296 has a height B2, which is greater than the height B1 of the expandable fluid region 296 when in the non-actuated state. Although not shown, it should be noted that the electrode pair 204 may be partially actuated to a position between the non-actuated state and the actuated state. This would allow for partial inflation of the expandable fluid region 296 and adjustments when necessary.

In order to move the first electrode 206 and the second electrode 208 toward one another, a voltage is applied by a power supply. In some embodiments, a voltage of up to 10 kV may be provided from the power supply to induce an electric field through the dielectric fluid 298. The resulting attraction between the first electrode 206 and the second electrode 208 pushes the dielectric fluid 298 into the expandable fluid region 296. Pressure from the dielectric fluid 298 within the expandable fluid region 296 causes the first film layer 222 and the first electrical insulator layer 210 to deform in a first axial direction along the center axis C of the first electrode 206 and causes the second film layer 224 and the second electrical insulator layer 212 to deform in an opposite second axial direction along the center axis C of the second electrode 208. Once the voltage being supplied to the first electrode 206 and the second electrode 208 is discontinued, the first electrode 206 and the second electrode 208 return to their initial, non-parallel position in the non-actuated state.

It should be appreciated that the present embodiments disclosed herein, specifically, the tab portions 232, 254 with the interconnecting bridge portions 274, 276, provide a number of improvements over actuators, such as HASEL actuators, that do not include the tab portions 232, 254. Embodiments of the artificial muscle 200 including two pairs of tab portions 232, 254 on each of the first electrode 206 and the second electrode 208, respectively, reduces the overall mass and thickness of the artificial muscle 200, reduces the amount of voltage required during actuation, and decreases the total volume of the artificial muscle 200 without reducing the amount of resulting force after actuation as compared to known HASEL actuators including donut-shaped electrodes having a uniform, radially-extending width. More particularly, the tab portions 232, 254 of the artificial muscle 200 provide zipping fronts that result in increased actuation power by providing localized and uniform hydraulic actuation of the artificial muscle 200 compared to HASEL actuators including donut-shaped electrodes. Specifically, one pair of tab portions 232, 254 provides twice the amount of actuator power per unit volume as compared to donut-shaped HASEL actuators, while two pairs of tab portions 232, 254 provide four times the amount of actuator power per unit volume. The bridge portions 274, 276 interconnecting the tab portions 232, 254 also limit buckling of the tab portions 232, 254 by maintaining the distance between adjacent tab portions 232, 254 during actuation. Because the bridge portions 274, 276 are integrally formed with the tab portions 232, 254, the bridge portions 274, 276 also prevent leakage between the tab portions 232, 254 by eliminating attachment locations that provide an increased risk of rupturing.

In operation, when the artificial muscle 200 is actuated by providing a voltage, expansion of the expandable fluid region 296 produces a force of 3 Newton-millimeters (N·mm) per cubic centimeter ($cm^3$) of actuator volume or greater, such as 4 N·mm per $cm^3$ or greater, 5 N·mm per $cm^3$ or greater, 6 N·mm per $cm^3$ or greater, 7 N·mm per $cm^3$ or greater, 8 N·mm per $cm^3$ or greater, or the like. Providing the voltage may comprise generating the voltage, for example, in an embodiment in which the power supply is a battery, converting the voltage, for example in embodiment in which the power supply is a power adaptor, or any other known or yet to be developed technique for readying a voltage for application. In one example, when the artificial muscle 100 is actuated by a voltage of 9.5 kilovolts (kV), the artificial muscle 200 provides a resulting force of 5 N. In another example, when the artificial muscle 200 is actuated by a voltage of 10 kV the artificial muscle 200 provides 440% strain under a 500 gram load.

Moreover, the size of the first electrode 206 and the second electrode 208 is proportional to the amount of displacement of the dielectric fluid 298. Therefore, when greater displacement within the expandable fluid region 296 is desired, the size of the electrode pair 204 is increased relative to the size of the expandable fluid region 296. It should be appreciated that the size of the expandable fluid region 296 is defined by the central openings 246, 268 in the first electrode 206 and the second electrode 208. Thus, the degree of displacement within the expandable fluid region 296 may alternatively, or in addition, be controlled by increasing or reducing the size of the central openings 246, 268.

Referring now to FIG. 9, an actuation system 300 may be provided for operating an artificial muscle, such as the artificial muscles 100, 200, between the non-actuated state and the actuated state. Thus, the actuation system 300 may include a controller 302, an operating device 304, a power supply 306, and a communication path 308. The various components of the actuation system 300 will now be described.

The controller 302 includes a processor 310 and a non-transitory electronic memory 312 to which various components are communicatively coupled. In some embodiments, the processor 310 and the non-transitory electronic memory 312 and/or the other components are included within a single device. In other embodiments, the processor 310 and the non-transitory electronic memory 312 and/or the other components may be distributed among multiple devices that are communicatively coupled. The controller 302 includes non-transitory electronic memory 312 that stores a set of machine-readable instructions. The processor 310 executes the machine-readable instructions stored in the non-transitory electronic memory 312. The non-transitory electronic memory 312 may comprise RAM, ROM, flash memories, hard drives, or any device capable of storing machine-readable instructions such that the machine-readable instructions can be accessed by the processor 310. Accordingly, the actuation system 300 described herein may be implemented in any conventional computer programming language, as pre-programmed hardware elements, or as a combination of hardware and software components. The non-transitory electronic memory 312 may be implemented as one memory module or a plurality of memory modules.

In some embodiments, the non-transitory electronic memory 312 includes instructions for executing the functions of the actuation system 300. The instructions may include instructions for operating the artificial muscles 100, 200 based on a user command.

The processor 310 may be any device capable of executing machine-readable instructions. For example, the processor 310 may be an integrated circuit, a microchip, a computer, or any other computing device. The non-transitory electronic memory 312 and the processor 310 are coupled to the communication path 308 that provides signal interconnectivity between various components and/or modules of the actuation system 300. Accordingly, the communication path 308 may communicatively couple any number of processors with one another, and allow the modules coupled to the communication path 308 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 9, the communication path 308 communicatively couples the processor 310 and the non-transitory electronic memory 312 of the controller 302 with a plurality of other components of the actuation system 300. For example, the actuation system 300 depicted in FIG. 9 includes the processor 310 and the non-transitory electronic memory 312 communicatively coupled with the operating device 304 and the power supply 306.

The operating device 304 allows for a user to control operation of the artificial muscles 100, 200. In some embodiments, the operating device 304 may be a switch, toggle, button, or any combination of controls to provide user operation. As a non-limiting example, a user may actuate the artificial muscles 100, 200 into the actuated state by activating controls of the operating device 304 to a first position. While in the first position, the artificial muscles 100, 200 will remain in the actuated state. The user may switch the artificial muscles 100, 200 into the non-actuated state by operating the controls of the operating device 304 out of the first position and into a second position.

The operating device 304 is coupled to the communication path 308 such that the communication path 308 communicatively couples the operating device 304 to other modules of the actuation system 300. The operating device 304 may provide a user interface for receiving user instructions as to a specific operating configuration of the artificial muscles 100, 200. In addition, user instructions may include instructions to operate the artificial muscles 100, 200 only at certain conditions.

The power supply 306 (e.g., battery) provides power to the artificial muscles 100, 200. In some embodiments, the power supply 306 is a rechargeable direct current power source. It is to be understood that the power supply 306 may be a single power supply or battery for providing power to the artificial muscle 100, 200. A power adapter (not shown) may be provided and electrically coupled via a wiring harness or the like for providing power to the artificial muscles 100, 200 via the power supply 306. Indeed, the power supply 306 is a device that can receive power at one level (e.g., a first voltage, power level, or current) and output power at a second level (e.g., a second voltage, power level, or current).

In some embodiments, the actuation system 300 also includes a display device 314. The display device 314 is coupled to the communication path 308 such that the communication path 308 communicatively couples the display device 314 to other modules of the actuation system 300. The display device 314 may output a notification in response to an actuation state of the artificial muscles 100, 200 or indication of a change in the actuation state of the artificial muscles 100, 200. Moreover, the display device 314 may be a touchscreen that, in addition to providing optical information, detects the presence and location of a tactile input upon a surface of or adjacent to the display device 314. Accordingly, the display device 314 may include the operating device 304 and receive mechanical input directly upon the optical output provided by the display device 314.

In some embodiments, the actuation system 300 includes network interface hardware 316 for communicatively coupling the actuation system 300 to a portable device 318 via a network 320. The portable device 318 may include, without limitation, a smartphone, a tablet, a personal media player, or any other electric device that includes wireless communication functionality. It is to be appreciated that, when provided, the portable device 318 may serve to provide user commands to the controller 302, instead of the operating device 304. As such, a user may be able to control or set a program for controlling the artificial muscles 100, 200 without utilizing the controls of the operating device 304. Thus, the artificial muscles 100, 200 may be controlled remotely via the portable device 318 wirelessly communicating with the controller 302 via the network 320.

From the above, it is to be appreciated that defined herein is an artificial muscle having an electrode pair and one or more stiffening members for providing an increasing stiffness of the artificial muscle toward an expandable fluid region at an end opposite the electrode pair or a center portion thereof. This ensures that the artificial muscle zips inwardly to direct a dielectric fluid into the expandable fluid region on demand.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An artificial muscle comprising:
a housing having an electrode region and an expandable fluid region;
an electrode pair including a first electrode and a second electrode positioned in the electrode region of the housing;
a dielectric fluid housed within the housing; and
a stiffening member positioned between the housing and at least one of the first electrode and the second electrode, the stiffening member having a gradient stiffness increasing a stiffness of the housing in a direction toward the expandable fluid region from an opposite edge of the electrode region,
wherein the electrode pair is actuatable between a non-actuated state and an actuated state such that actuation from the non-actuated state to the actuated state directs the dielectric fluid into the expandable fluid region.

2. The artificial muscle of claim 1, further comprising a stiffening member positioned between the housing and each of the first electrode and the second electrode.

3. The artificial muscle of claim 1, further comprising a pair of stiffening members positioned between the housing and at least one of the first electrode and the second electrode, a first stiffening member of the pair of stiffening members having a first length, a second stiffening member of the pair of stiffening members having a second length greater than the first length, the first stiffening member positioned between the housing and the second stiffening member.

4. The artificial muscle of claim 2, further comprising a pair of stiffening members positioned between the housing and each of the first electrode and the second electrode, a first stiffening member of the pair of stiffening members having a first length, a second stiffening member of the pair of stiffening members having a second length greater than the first length, the first stiffening member positioned between the housing and the second stiffening member.

5. The artificial muscle of claim 1, wherein the housing is a flexible housing comprising an elastomeric material.

6. The artificial muscle of claim 5, wherein the housing comprises a biaxially oriented polypropylene layer.

7. The artificial muscle of claim 6, wherein the housing comprises a pair of biaxially oriented polypropylene layers.

8. The artificial muscle of claim 4, wherein each stiffening member comprises a biaxially oriented polypropylene layer.

9. The artificial muscle of claim 1, wherein the first electrode and the second electrode each comprises two or more tab portions and two or more bridge portions, each of the two or more bridge portions interconnects adjacent tab portions, and at least one of the first electrode and the second electrode comprises a central opening positioned between the two or more tab portions and encircling the expandable fluid region.

10. An artificial muscle comprising:
a housing having an electrode region and an expandable fluid region;
an electrode pair including a first electrode and a second electrode positioned in the electrode region of the housing;
a dielectric fluid housed within the housing; and
a pair of stiffening members positioned between the housing and each of the first electrode and the second electrode, each stiffening member of the pair of stiffening members having a gradient stiffness increasing a stiffness of the housing in a direction toward the expandable fluid region from an opposite edge of the electrode region,
wherein the electrode pair is actuatable between a non-actuated state and an actuated state such that actuation from the non-actuated state to the actuated state causes a distance between the electrode pair proximate the opposite edge of the electrode region to be decreased prior to a distance between the electrode pair proximate the expandable fluid region being decreased.

11. The artificial muscle of claim 10, wherein a first stiffening member of the pair of stiffening members has a first length, a second stiffening member of the pair of stiffening members has a second length greater than the first length, and the first stiffening member is positioned between the housing and the second stiffening member.

12. The artificial muscle of claim 10, wherein the housing comprises a pair of biaxially oriented polypropylene layers.

13. The artificial muscle of claim 10, wherein each stiffening member comprises a biaxially oriented polypropylene layer.

14. The artificial muscle of claim 10, wherein the first electrode and the second electrode each comprises two or more tab portions and two or more bridge portions, each of the two or more bridge portions interconnects adjacent tab portions, and at least one of the first electrode and the second electrode comprises a central opening positioned between the two or more tab portions and encircling the expandable fluid region.

15. The artificial muscle of claim 14, wherein each of stiffening member comprises two or more tab portions and two or more bridge portions, each of the two or more bridge portions interconnects adjacent tab portions, and at least one of the stiffening members comprises a central opening positioned between the two or more tab portions and encircling the expandable fluid region.

16. A method for actuating an artificial muscle, the method comprising:
providing a voltage using a power supply electrically coupled to an electrode pair of an artificial muscle, the artificial muscle comprising:
a housing having an electrode region and an expandable fluid region;
the electrode pair including a first electrode and a second electrode positioned in the electrode region of the housing;
a dielectric fluid housed within the housing; and
a stiffening member positioned between the housing and at least one of the first electrode and the second electrode, the stiffening member having a gradient stiffness increasing a stiffness of the housing in a direction toward the expandable fluid region from an opposite edge of the electrode region, and
applying the voltage to the electrode pair of the artificial muscle, thereby actuating the electrode pair from a non-actuated state to an actuated state such that the dielectric fluid is directed into the expandable fluid region of the housing and expands the expandable fluid region.

17. The method of claim 16, wherein the housing comprises a first film layer and a second film layer, and partially heat sealing the first film layer and the second to one another to define a sealed portion of the housing, the housing further comprising an unsealed portion surrounded by the sealed portion, wherein the electrode region and the expandable fluid region of the housing are disposed in the unsealed portion.

18. The method of claim 16, wherein a pair of stiffening members are positioned between the housing and each of the first electrode and the second electrode, a first stiffening member of the pair of stiffening members having a first length, a second stiffening member of the pair of stiffening members having a second length greater than the first length, the first stiffening member positioned between the housing and the second stiffening member.

19. The method of claim 18, wherein the housing and the pair of stiffening members each comprises a biaxially oriented polypropylene layer.

20. The method of claim 16, wherein expanding the expandable fluid region produces a force greater than 4 N·mm per $cm^3$ of actuator volume.

* * * * *

UNITED STATES PATENT AND TRADEMARK OFFICE
CERTIFICATE OF CORRECTION

| | | |
|---|---|---|
| PATENT NO. | : 11,491,647 B2 | Page 1 of 1 |
| APPLICATION NO. | : 17/168376 | |
| DATED | : November 8, 2022 | |
| INVENTOR(S) | : Michael P. Rowe and Ryohei Tsuruta | |

It is certified that error appears in the above-identified patent and that said Letters Patent is hereby corrected as shown below:

In the Specification

In Column 12, Line(s) 61, delete "an".

Signed and Sealed this
Twentieth Day of December, 2022

Katherine Kelly Vidal
*Director of the United States Patent and Trademark Office*